(12) United States Patent
Burgin et al.

(10) Patent No.: US 8,032,268 B2
(45) Date of Patent: Oct. 4, 2011

(54) METHODS AND SYSTEMS FOR INDICATING WHETHER AN AIRCRAFT IS BELOW A MINIMUM ALTITUDE CRITERION FOR A SECTOR

(75) Inventors: Roger W. Burgin, Scottsdale, AZ (US); Aaron Gannon, Anthem, AZ (US); Blake Wilson, Peoria, AZ (US); Edward Tomaszewski, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 570 days.

(21) Appl. No.: 12/240,510

(22) Filed: Sep. 29, 2008

(65) Prior Publication Data

US 2010/0082186 A1 Apr. 1, 2010

(51) Int. Cl.
*G01C 21/00* (2006.01)
*G01C 23/00* (2006.01)

(52) U.S. Cl. .............................. 701/8; 701/207; 340/977
(58) Field of Classification Search ............... 701/8, 207; 340/977
See application file for complete search history.

(56) References Cited

U.S. PATENT DOCUMENTS

| | | | | |
|---|---|---|---|---|
| 4,224,669 A | * | 9/1980 | Brame | ............................... 701/8 |
| 4,675,823 A | | 6/1987 | Noland | |
| 4,792,906 A | * | 12/1988 | King et al. | ........................ 701/5 |
| 4,896,154 A | * | 1/1990 | Factor et al. | ............. 340/995.27 |
| 5,057,835 A | | 10/1991 | Factor et al. | |
| 5,978,715 A | * | 11/1999 | Briffe et al. | ..................... 701/11 |
| 6,076,042 A | | 6/2000 | Tognazzini | |
| 6,456,940 B1 | * | 9/2002 | Higgins | ........................ 701/301 |
| 6,505,102 B2 | | 1/2003 | Morizet et al. | |
| 6,906,641 B2 | | 6/2005 | Ishihara | |
| 7,030,780 B2 | | 4/2006 | Shiomi et al. | |
| 7,327,285 B2 | | 2/2008 | McCauley et al. | |
| 7,363,121 B1 | | 4/2008 | Chen et al. | |
| 2002/0126040 A1 | * | 9/2002 | Block | .............................. 342/65 |
| 2002/0143439 A1 | * | 10/2002 | Morizet et al. | ..................... 701/3 |
| 2004/0111192 A1 | | 6/2004 | Naimer et al. | |
| 2005/0113985 A1 | * | 5/2005 | Greene | ............................. 701/9 |
| 2006/0253231 A1 | | 11/2006 | Khatwa | |
| 2007/0043482 A1 | * | 2/2007 | Aimar | ............................... 701/4 |
| 2007/0129855 A1 | * | 6/2007 | Coulmeau | ......................... 701/3 |
| 2007/0250223 A1 | * | 10/2007 | Francois et al. | .................. 701/9 |

* cited by examiner

*Primary Examiner* — Mark Hellner
*Assistant Examiner* — Ari M. Diacou
(74) *Attorney, Agent, or Firm* — Ingrassia Fisher & Lorenz, P.C.

(57) ABSTRACT

Methods and systems are provided for indicating whether an aircraft is below a designated minimum safe altitude level for an altitude sector. A method comprises displaying a graphical representation of a first sector on a display device associated with the aircraft. The first sector corresponds to a geographic area having a first minimum altitude criterion. If a current altitude of the aircraft is below the first minimum altitude criterion, the method continues by displaying the graphical representation of the first sector using a first visually distinguishing characteristic chosen to indicate that the aircraft is below the designated altitude level for the first sector.

20 Claims, 6 Drawing Sheets

METHODS AND SYSTEMS FOR INDICATING WHETHER AN AIRCRAFT IS BELOW A MINIMUM ALTITUDE CRITERION FOR A SECTOR

TECHNICAL FIELD

The subject matter described herein relates generally to avionics systems, and more particularly, embodiments of the subject matter relate to flight management systems and related cockpit displays adapted for indicating whether an aircraft is below a designated minimum altitude for a sector.

BACKGROUND

The minimum (or lowest) safe altitude is used in aviation to designate an altitude level deemed safe over a particular geographic region. Generally, the minimum safe altitude is an altitude level that incorporates a safety buffer above the obstacles and/or terrain within a particular geographic region proximate to a route that an aircraft may travel. The minimum safe altitude is intended to ensure clearance over obstacles and terrain during flight.

Often, the minimum safe altitude is determined based on criteria provided by a governmental or regulatory organization. For example, in the United States, the Federal Aviation Administration defines criteria for the minimum safe altitude in the Federal Aviation Regulations. The regulations may provide a specific safety buffer for determining the minimum safe altitude for a region, for example, an altitude of 1,000 feet above the highest obstacle within a horizontal distance of four nautical miles. By flying an aircraft at or above the minimum safe altitude, the pilot complies with the terrain and obstacle clearance requirements for the particular geographic region.

For instrument-based operations in accordance with instrument flight rules (IFR), the minimum safe altitudes are often published on aeronautical charts for various airways, routes, and approaches for a given navigation reference point. These aeronautical charts are published as printed procedures or charts, also known as approach plates. Depending on the navigational reference point, these paper charts often include a Minimum Sector Altitude (MSA) or Terminal Arrival Area (TAA) which depicts the minimum safe altitude for various sectors or regions surrounding the navigational reference point.

Generally, a pilot must maintain copies of these printed charts and utilize the proper chart during flight. After identifying the proper chart, the pilot must locate the appropriate sector that corresponds to the current location of the aircraft, the corresponding minimum safe altitude for the sector, and then compare it to the current altitude of the aircraft to determine if the minimum safe altitude criterion for the current sector is met. The published charts are oriented north-up and often require a pilot to manually rotate and position the chart to orient it based on the current heading of the aircraft. The minimum safe altitude is often located in the corner of the chart, or in the case of a TAA, spread out at various locations on the chart, making it difficult to locate the minimum safe altitude for a given sector. Additionally, these charts often include a variety of other information relating to the given navigational facility, further obfuscating the desired minimum safe altitude information. Thus, using and maintaining the printed charts is both cumbersome and confusing.

BRIEF SUMMARY

A method is provided for indicating whether an aircraft is below a designated altitude level. The method comprises displaying a graphical representation of a first sector on a display device associated with the aircraft. The first sector corresponds to a geographic area having a first minimum altitude criterion. If a current altitude of the aircraft is below the first minimum altitude criterion, the method continues by displaying the graphical representation of the first sector using a first visually distinguishing characteristic chosen to indicate that the aircraft is below the designated altitude level for the first sector.

An apparatus is provided for an electronic device having rendered thereon a graphical display of a navigational map associated with a current location of an aircraft. The graphical display comprises a sector overlying the navigational map that corresponds to a geographic region having a minimum altitude value, and an aircraft image overlying the navigational map. The aircraft image is positioned such that its position corresponds to the current location of the aircraft. If the current location of the aircraft is within the geographic region that corresponds to the sector and the current altitude of the aircraft is below the minimum altitude value, the sector is highlighted using a first visually distinguishing characteristic to indicate noncompliance with the minimum altitude value. If the current location of the aircraft is within the geographic region that corresponds to the sector and the current altitude of the aircraft is above the minimum altitude value, the sector is highlighted using a second visually distinguishing characteristic to indicate compliance with the minimum altitude value.

BRIEF DESCRIPTION OF THE DRAWINGS

Embodiments of the subject matter will hereinafter be described in conjunction with the following drawing figures, wherein like numerals denote like elements.

DETAILED DESCRIPTION

Figure 1:
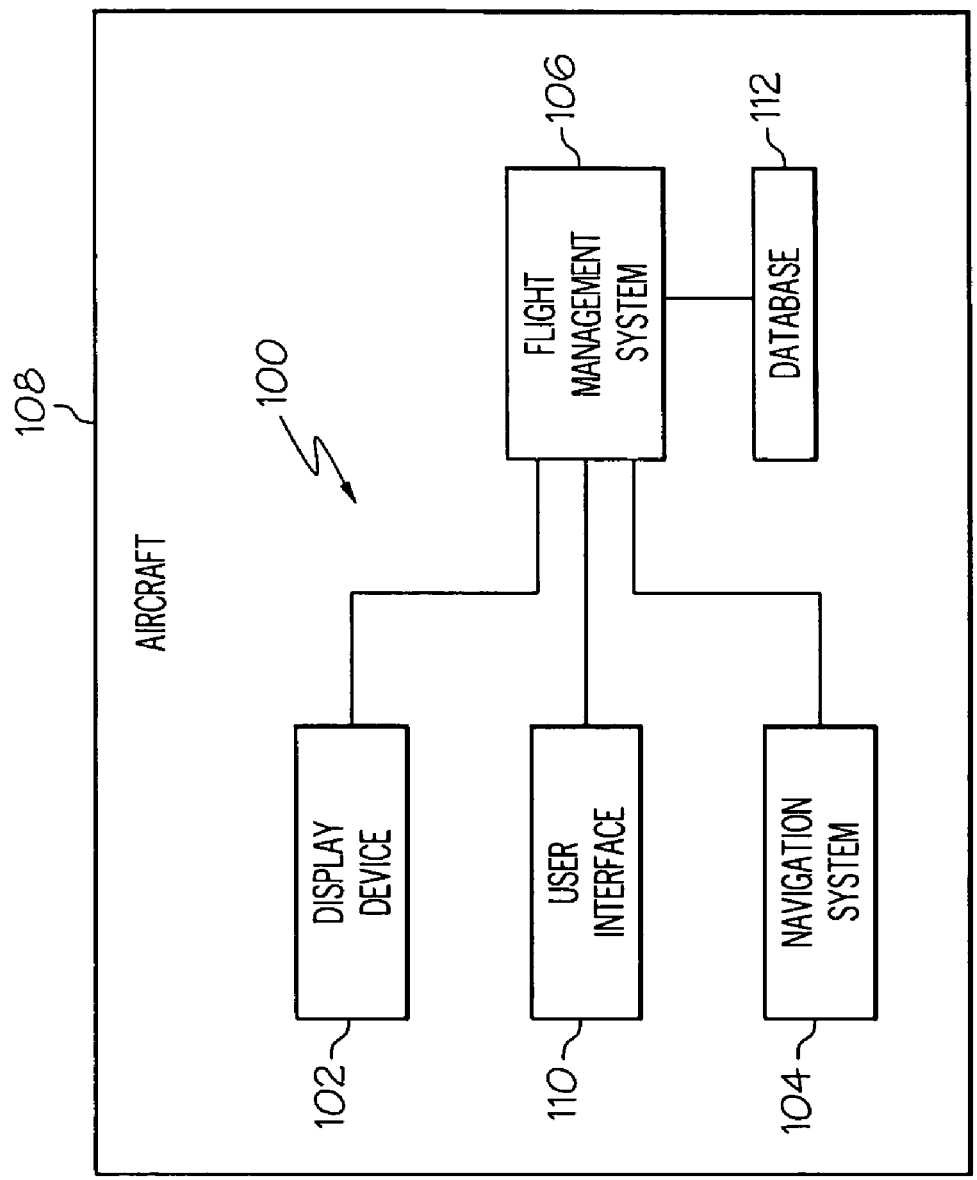
FIG. 1 is a block diagram of a display system suitable for use in an aircraft in accordance with one embodiment.

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to flight management systems adapted for indicating, on a display device associated with an aircraft, whether the aircraft is below the designated minimum safe altitude for a sector corresponding to the current location of the aircraft. If the aircraft is below the designated minimum safe altitude, the sector is displayed using a first visually distinguishable characteristic which indicates noncompliance with the minimum safe altitude. Otherwise, if the aircraft is not below the designated minimum safe altitude, the sector is displayed using a second visually distinguishable characteristic which indicates compliance with the minimum safe altitude.

FIG. 1 depicts an exemplary embodiment of a display system 100, which may be located onboard an aircraft 108. This embodiment of display system 100 may include, without limitation, a display device 102, a navigation system 104, and a flight management system 106 (FMS). The display system 100 may further include a user interface 110 for enabling interactivity with the display system 100. The display system 100 may also include a database 112 suitably configured to support operation of the display system 100 as described in greater detail below.

It should be understood that FIG. 1 is a simplified representation of a display system 100 for purposes of explanation and ease of description, and FIG. 1 is not intended to limit the application or scope of the subject matter in any way. In practice, the display system 100 and/or aircraft 108 will include numerous other devices and components for providing additional functions and features, as will be appreciated in the art.

In an exemplary embodiment, the display device 102 is coupled to the flight management system 106. The flight management system 106 is coupled to the navigation system 104 for obtaining real-time data and/or information regarding operation of the aircraft 108. The flight management system 106 is configured to display, render, or otherwise convey one or more graphical representations or images associated with operation of the aircraft 108 on the display device 102, as described in greater detail below. In accordance with one or more embodiments, the flight management system 106 is configured to determine and indicate on the display device 102 whether the aircraft 108 is above or below a predetermined minimum safe altitude level for a geographic region proximate to an identified navigational reference point. In this regard, the user interface 110 may be coupled to the flight management system 106 to allow a pilot and/or crew member to indicate and/or identify a desired navigational reference point, as described in greater detail below.

In an exemplary embodiment, the display device 102 is realized as an electronic display configured to graphically display flight information or other data associated with operation of the aircraft 108 under control of the flight management system 106, as will be understood. In an exemplary embodiment, the display device 102 is located within a cockpit of the aircraft 108. It will be appreciated that although FIG. 1 shows a single display device 102, in practice, additional display devices may be present onboard the aircraft 108. The user interface 110 may also be located within the cockpit of the aircraft 108 and adapted to allow a user (e.g., pilot, co-pilot, or crew member) to interact with the flight management system 106, as described in greater detail below. In various embodiments, the user interface 110 may be realized as a keypad, touchpad, keyboard, mouse, touchscreen, joystick, or another suitable device adapted to receive input from a user. In an exemplary embodiment, the user interface 110 and flight management system 106 are cooperatively configured to enable a user to indicate and/or select a desired navigational reference point, as described below.

It should be appreciated that although FIG. 1 shows the display device 102 and user interface 110 within the aircraft 108, in practice, either or both may be located outside the aircraft 108 (e.g., on the ground as part of an air traffic control center or another command center) and communicatively coupled to the flight management system 106 over a data link. For example, the display device 102 and/or user interface 110 may communicate with the flight management system 106 using a radio communication system or another data link system, such as a controller pilot data link (CPDL).

In an exemplary embodiment, the navigation system 104 is configured to obtain one or more navigational parameters associated with operation of the aircraft 108. The navigation system 104 may be realized as a global positioning system (GPS), inertial reference system (IRS), or a radio-based navigation system (e.g., VHF omni-directional radio range (VOR) or long range aid to navigation (LORAN)), and may include one or more sensors suitably configured to support operation of the navigation system 104, as will be appreciated in the art. In this regard, navigation system 104 may communicate with one or more navigational aids, as will be understood. In an exemplary embodiment, the navigation system 104 is capable of obtaining and/or determining the current location of the aircraft 108 (e.g, the latitude and longitude) and the heading of the aircraft 108 (i.e., the direction the aircraft is traveling in relative to some reference) and providing these navigational parameters to the flight management system 106.

In an exemplary embodiment, the flight management system 106 (or, alternatively, a flight management computer) is located onboard the aircraft 108. Although FIG. 1 is a simplified representation of display system 100, in practice, the flight management system 106 may be coupled to one or more additional modules or components as necessary to support navigation, flight planning, and other aircraft control functions in a conventional manner. In an exemplary embodiment, the flight management system 106 is configured to obtain and/or determine the instantaneous altitude of the aircraft 108. In addition, the flight management system 106 may include or otherwise access a terrain database or other navigational information for rendering a navigational map on the display device 102, as described below. The navigational map may be based on one or more sectional charts, topographic maps, digital maps, or any other suitable commercial or military database or map, as will be appreciated in the art.

In an exemplary embodiment, the flight management system 106 accesses or includes a database 112 that contains designated minimum safe altitude information for a plurality of known navigational reference points. The navigational reference points may comprise navigational aids, such as VHF omni-directional ranges (VORs), distance measuring equipment (DMEs), tactical air navigation aids (TACANs), and combinations thereof (e.g., VORTACs). As used herein, "navigational reference point" and variants thereof should also be understood as encompassing position fixes, such as initial approach fixes (IAFs), final approach fixes (FAFs) and other navigational reference points used in area navigation (RNAV). In an exemplary embodiment, the navigational reference points are located near a landing location (e.g., an airport), and each navigational reference point has one or more sectors proximate to the navigational reference point, each sector having a designated minimum safe altitude level. In this regard, the landing location and/or navigational reference point may have one or more associated approaches, wherein the designated minimum safe altitude may be displayed on a published chart or approach plate for the navigational reference point. In an exemplary embodiment, for each navigational reference point, the database 112 maintains information regarding the geographic area corresponding to one or more sectors surrounding the navigational reference point, along with a designated minimum safe altitude value for each sector. For example, the database 112 may maintain, for each sector, one or more bearings which define the angular boundaries of the sector, a distance or radius which defines the radial extent of the sector from the navigational reference point, and a designated minimum safe altitude for the sector.

Figure 2:
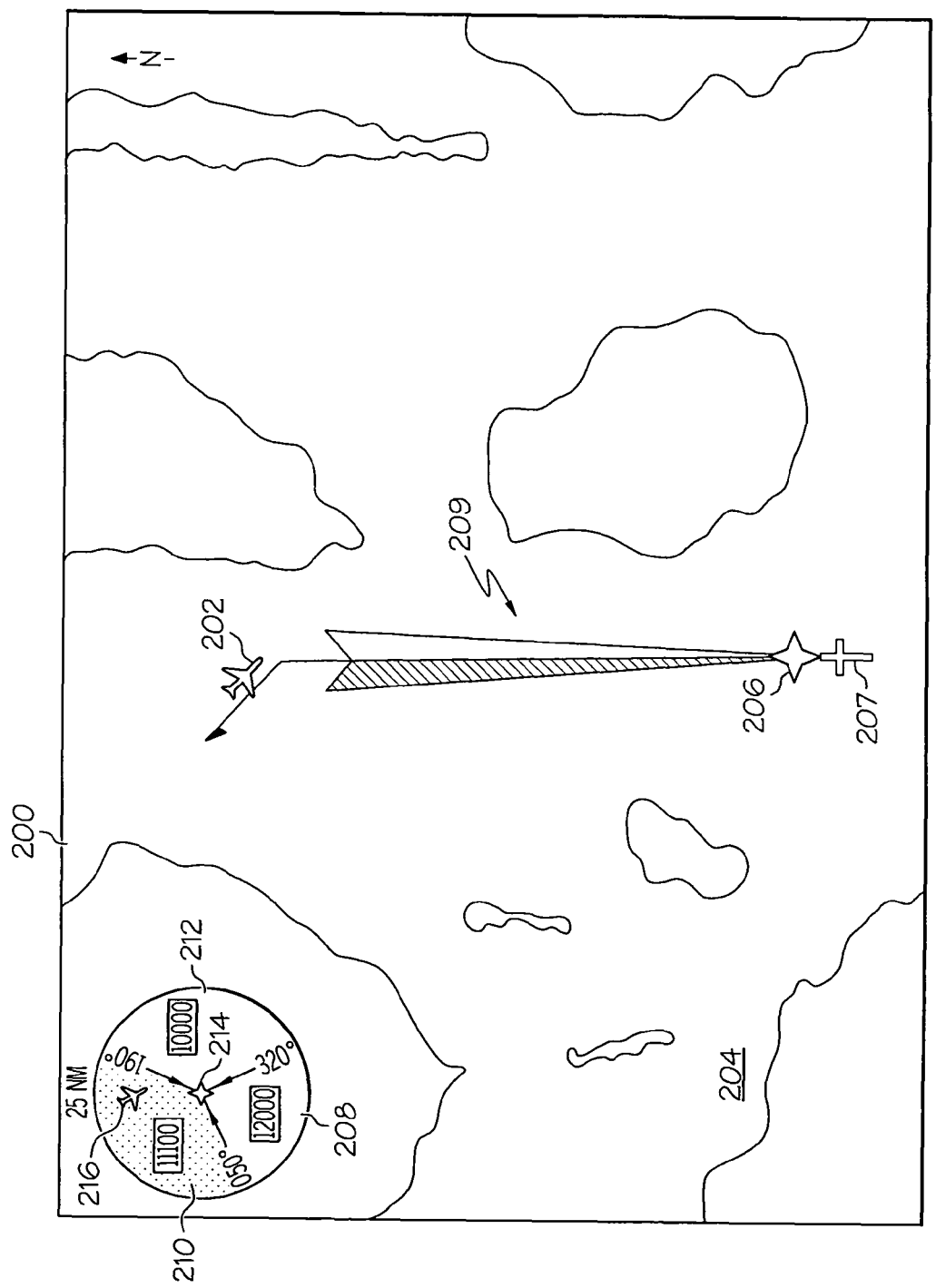
FIG. 2 is a schematic view of an exemplary navigational map suitable for use with the display system of FIG. 1.

Referring now to FIG. 2, and with continued reference to FIG. 1, the flight management system 106 is configured to control the rendering of a navigational map 200 graphically displayed on the display device 102. The flight management system may also be configured to render a graphical representation of the aircraft 202 on the map 200, which may be overlaid or rendered on top of a background 204. The background 204 may be a graphical representation of the terrain, topology, or other suitable items or points of interest within a given distance of the aircraft 108, which may be maintained by the flight management system 106 in a terrain database or navigational database, as will be understood. As described in greater detail below, the flight management system 106 may also render a graphical representation of an identified navigational reference point 206 along with one or more altitude sectors 208, 210, 212 associated with the identified navigational reference point overlying the background 204. In an exemplary embodiment, the navigational reference point 206 is located proximate a landing location (e.g., airport, runway, landing strip) having an approach path. The flight management system 106 may be configured to render or display a graphical representation of the landing location 207 and the associated approach path 209 on the navigational map 200, as will be understood.

Although FIG. 2 depicts a top view (e.g., from above the aircraft 202) of the navigational map 200, in practice, alternative embodiments may utilize various perspective views, such as side views, three-dimensional views (e.g., a three-dimensional synthetic vision display), angular or skewed views, and the like. Further, in some embodiments, the aircraft 202 may be shown as traveling across the map 200, as opposed to being located at a fixed position on the map 200, and FIG. 2 does not limit the scope of the subject matter in any way.

In an exemplary embodiment, the map 200 is associated with the movement of the aircraft, and the background 204 refreshes or updates as the aircraft travels, such that the graphical representation of the aircraft 202 is positioned over the background 204 in a manner that accurately reflects the instantaneous (or substantially real-time) real-world positioning of the aircraft 108 relative to the earth. In accordance with one embodiment, the map 200 is updated or refreshed such that it is centered on and/or aligned with the aircraft 202. Although the navigational map 200 shown in FIG. 2 is oriented north-up (i.e., moving upward on the map 200 corresponds to traveling northward), as described below, in other embodiments, the navigational map 200 may be oriented track-up or heading-up, i.e., aligned such that the aircraft 202 is always traveling in an upward direction and the background 204 adjusted accordingly.

Figure 3:
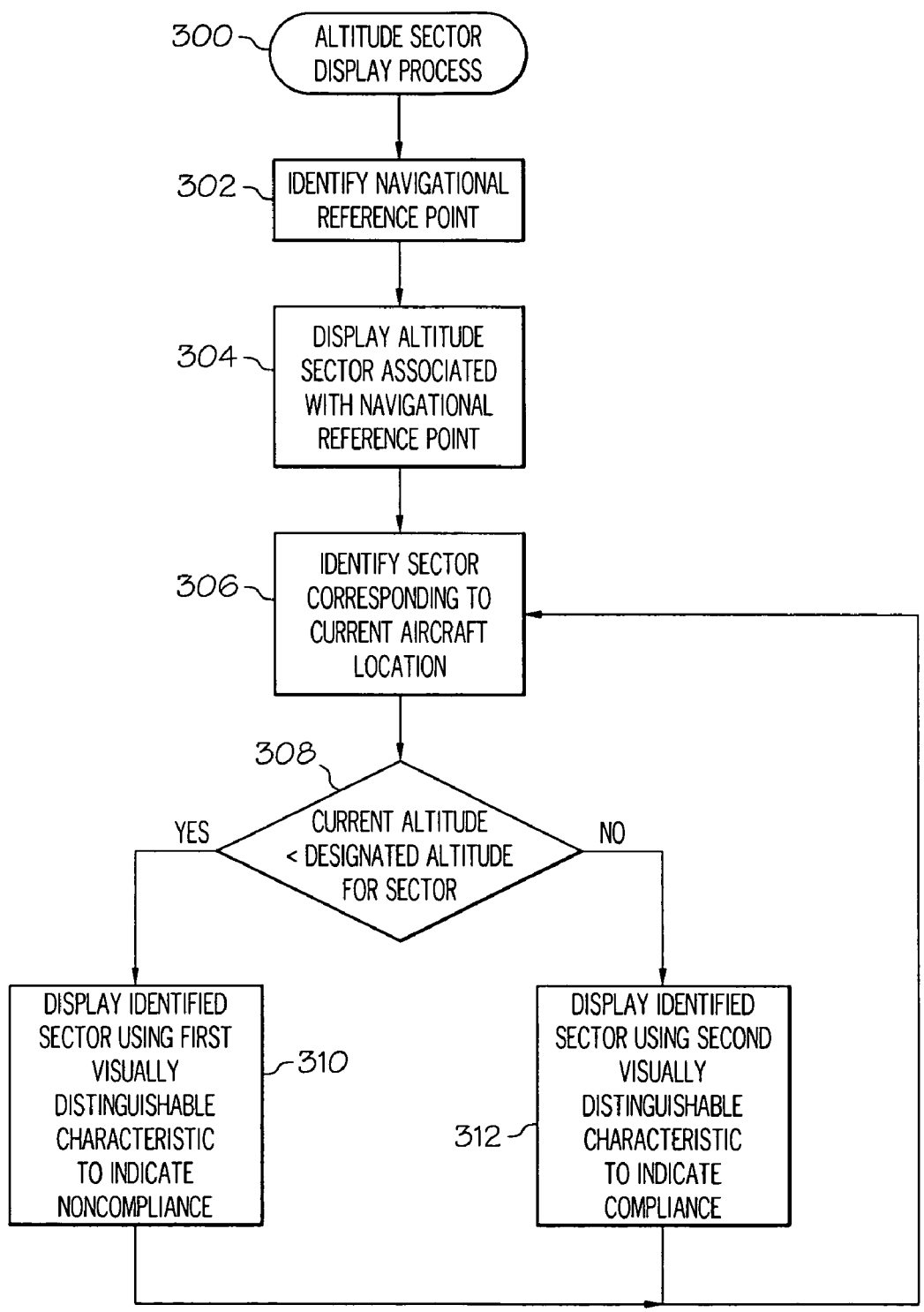
FIG. 3 a flow diagram of an exemplary altitude sector display process suitable for use with the display system of FIG. 1 in accordance with one embodiment.

Referring now to FIG. 3, in an exemplary embodiment, a display system 100 may be configured to perform an altitude sector display process 300 and additional tasks, functions, and operations described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the display device 102, the navigation system 104, the flight management system 106, the user interface 110, or the database 112. It should be appreciated that any number of additional or alternative tasks may be included, and may be incorporated into a more comprehensive procedure or process having additional functionality not described in detail herein.

Referring again to FIG. 3, and with continued reference to FIG. 1 and FIG. 2, an altitude sector display process 300 may be performed to indicate whether an aircraft is below the minimum safe altitude for an altitude sector surrounding a navigational reference point. In an exemplary embodiment, the altitude sector display process 300 may initialize by identifying a navigational reference point (task 302). In accordance with one embodiment, the navigational reference point may be identified by a user (e.g., a pilot or air traffic controller). For example, the user may designate or select a destination airport and/or landing location via user interface 110. In an exemplary embodiment, the airport and/or landing location has a designated IFR approach procedure which includes a Minimum Sector Altitude (MSA) or Terminal Arrival Area (TAA). In response to the user input, the flight management system may identify a navigational reference point associated with the identified airport and/or landing location, which is used to define one or more altitude sectors proximate the airport and/or landing location. Alternatively, the flight management system may automatically identify a navigational reference point. For example, the flight management system may identify the navigational reference point based on an airport and/or landing location previously entered into a flight plan. Alternatively, the flight management system may access a database (e.g., database 112) and determine the navigational reference point that is nearest the current location of the aircraft.

In an exemplary embodiment, the altitude sector display process 300 continues by displaying a graphical representation of an altitude sector associated with the identified navigational reference point on the display device (task 304). In accordance with one embodiment, the altitude sector display process 300 displays the altitude sector in response to determining the distance between the aircraft and the navigational reference point is less than a threshold distance. For example, many MSAs or TAAs extend radially outward from a respective navigational reference point for some distance, generally ranging from approximately twenty to thirty nautical miles. The flight management system may determine when the aircraft is within thirty nautical miles of the navigational reference point, and in response display the altitude sector on the display device.

Referring now to FIG. 2, with continued reference to FIG. 1 and FIG. 3, by way of example, the flight management system 106 may identify navigational reference point 206 as the identified navigational reference point. After identifying the navigational reference point 206, the flight management system 106 obtains the relevant bearing information for the altitude sectors 208, 210, 212 associated with the navigational reference point 206. The altitude sectors 208, 210, 212 correspond to geographic areas proximate the navigational reference point 206, each altitude sector 208, 210, 212 having a respective minimum altitude criterion. The minimum altitude criterion may be determined based on the real-world terrain and/or obstacles within the geographic area defined by the sectors 208, 210, 212 and adjusted to incorporate a safety buffer, which may be prescribed, for example, by regulations set forth by a governmental and/or regulatory body or airline company/operator. In the exemplary embodiment shown in FIG. 2, the altitude sectors 208, 210, 212 comprise a MSA for navigational reference point 206. A first sector 208 has bearing endpoints of 320° and 50° (measured relative to south, i.e., due south is 0°), with a minimum altitude value of 12,000 feet and a radius of 25 nautical miles from the navigational reference point 206. Second sector 210 has bearing endpoints of 50° and 190°, with a minimum altitude value of 11,100 feet and a radius of 25 nautical miles from the navigational reference point 206. Third sector 212 has bearing endpoints of 190° and 320°, with a minimum altitude value of 10,000 feet and a radius of 25 nautical miles from the navigational reference point 206.

In an exemplary embodiment, the altitude sectors 208, 210, 212 are displayed overlying the terrain background 204 of the navigational map 200. The altitude sectors 208, 210, 212 may have an initial or default display state (e.g., no visual effects, no obviously distinguishable visible characteristics, or the like). Although text conveying the respective minimum altitude for the sectors 208, 210, 212 is displayed within the sectors 208, 210, 212 in FIG. 2, in alternative embodiments, the respective minimum altitude may be displayed outside the sectors 208, 210, 212 or omitted entirely. In accordance with the embodiment illustrated in FIG. 2, the altitude sectors 208, 210, 212 are displayed in a corner of the navigational map 200. The altitude sector display process 300 may display a second graphical representation 214 of navigational reference point 206 on the display device. As shown in FIG. 2, the altitude sectors 208, 210, 212 are aligned with the navigational reference point 214 in a manner that corresponds to the real-world location of the respective geographic areas proximate to navigational reference point. In an exemplary embodiment, if the current location of the aircraft is within a geographical area defined by an altitude sector, the altitude sector display process 300 displays a second graphical representation of the aircraft 216 on the display device within the appropriate altitude sector 208, 210, 212. For example, as shown in FIG. 2, a graphical representation of the aircraft 216 is displayed within altitude sector 210 at a location that correlates with the real-world location of the aircraft 202 relative to the navigational reference point 206. In an exemplary embodiment, the aircraft 216 is displayed and/or positioned such that it reflects the instantaneous heading of the aircraft.

Figure 4:
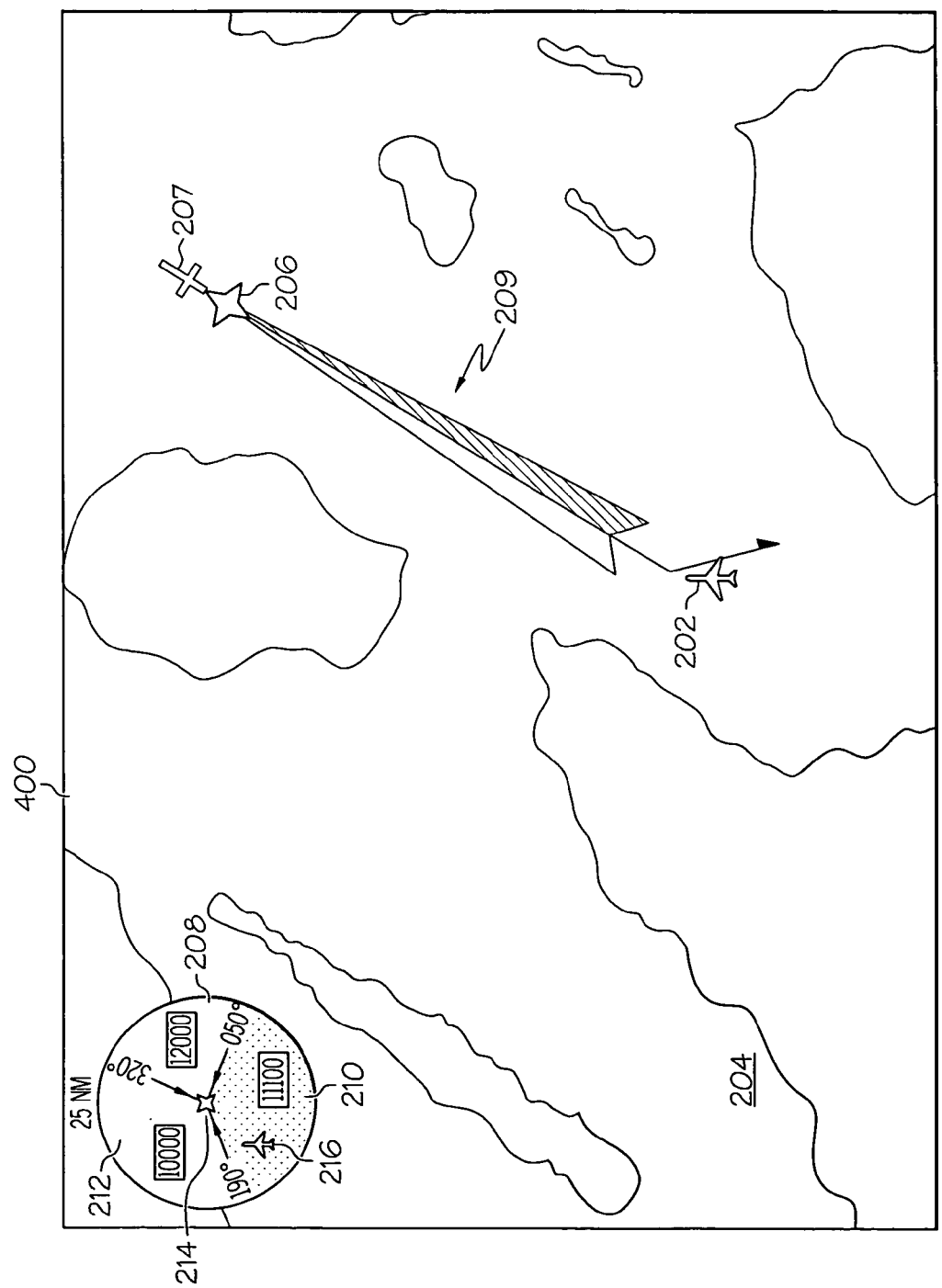
FIG. 4 is a schematic view of an exemplary navigational map, suitable for use with the altitude sector display process of FIG. 3, showing altitude sectors oriented in a track-up manner in accordance with one embodiment.

Referring now to FIG. 2 and FIG. 4, with continued reference to FIG. 1 and FIG. 3, depending on the embodiment, the altitude sector display process 300 may be configured to operate in a north-up mode or a track-up mode. FIG. 2 depicts the navigational map 200 in north-up mode and FIG. 4 depicts a navigational map 400 in track-up mode. As shown in FIG. 2, in north-up mode, the altitude sectors 208, 210, 212 are oriented such that the upward direction corresponds to North or 180°. The aircraft 216 is oriented in a manner that reflects the current heading of the aircraft relative to North. As shown in FIG. 4, in track-up mode (or heading-up mode), the altitude sectors 208, 210, 212 are rotated such that they are aligned with the instantaneous heading of the aircraft. For this particular embodiment, the aircraft 216 is fixedly displayed as traveling in the upward direction. For example, if the heading of the aircraft is due south, the altitude sector display process 300 may rotate the altitude sectors 208, 210, 212, for example, by adjusting the bearing endpoints by 180°. In this regard, when navigational map 400 is refreshed, altitude sector display process 300 may monitor the heading of the aircraft and adjust or reposition the altitude sectors 208, 210, 212 such they accurately reflect the instantaneous heading of the aircraft.

Referring again to FIG. 3, in an exemplary embodiment, the altitude sector display process 300 continues by identifying the altitude sector that corresponds to the current location of the aircraft (task 306). For example, as shown in FIG. 2, the flight management system 106 may identify the aircraft 108 location as being within the altitude sector 210. In an exemplary embodiment, the altitude sector display process 300 continues by comparing the current altitude of the aircraft to the minimum altitude value for the identified altitude sector (task 308). If the current altitude of the aircraft is below the minimum altitude criterion, the altitude sector display process 300 displays the identified altitude sector using a first visually distinguishing characteristic which is chosen to indicate that the aircraft is below the designated altitude level for the identified sector (task 310). The visually distinguishable characteristic may be realized by using one more of the following: color, hue, tint, brightness, graphically depicted texture or pattern, contrast, transparency, opacity, animation (e.g., strobing, flickering or flashing), and/or other graphical effects. In an exemplary embodiment, the visually distinguishable characteristic is used to highlight or focus the user's attention on the identified altitude sector relative to other altitude sectors. For example, referring again to FIG. 2, if the aircraft is below 11,100 feet, the altitude sector 210 may be displayed by shading and/or filling the interior of the sector 210 using amber, yellow, or another color designed to warn the pilot that the aircraft is below the designated minimum safe altitude for the current sector 210. In other embodiments, the interior of the sector 210 may be displayed with another visually distinguishable characteristic (brightness, contrast, tint, transparency, opacity) relative to the remaining images displayed on the navigational map 200. Similarly, the interior of the sector 210 may be highlighted by using a distinguishable animation or other graphical effects to alert the user of noncompliance with the minimum altitude level. Alternatively, the visually distinguishable characteristic may be applied to the outline of the identified sector, text associated with the identified sector, or the image of the aircraft 216. In some embodiments, the altitude sector display process 300 may also provide an audible warning to inform the pilot that the aircraft is below the designated minimum safe altitude for the identified sector.

If the current altitude of the aircraft is not below the minimum altitude value, the altitude sector display process 300 displays the identified altitude sector using a second visually distinguishing characteristic which indicates that the aircraft is within the identified altitude sector and at or above a safe altitude for the identified sector (task 312). For example, referring again to FIG. 2, if the aircraft is above 11,100 feet, the altitude sector 210 may be displayed in green or another color designed to indicate the aircraft is not below the designated minimum safe altitude for the current sector 210.

In an exemplary embodiment, the loop defined by tasks 306, 308, 310, 312 repeats as desired during operation of the aircraft. For example, the altitude sector display process 300 may continually refresh as long as the aircraft is within a threshold distance of the navigational reference point. In this manner, if the aircraft travels from a geographic area corresponding to first altitude sector to a geographic area corresponding to second altitude sector, the altitude sector display process 300 may identify the second altitude sector as the appropriate altitude sector for analysis (task 306). For example, referring again to FIG. 2, if the aircraft travels from altitude sector 210 to altitude sector 208, the altitude display process 300 may update the navigational map 200 to show the aircraft 216 within altitude sector 208. Altitude sector 210 may be restored to the initial or default state (as shown in FIG. 2, no coloring or highlighting), while altitude sector 208 is displayed in a manner that is influenced by the altitude of the aircraft (tasks 308, 310, 312). For example, if the aircraft is traveling over a geographic area within altitude sector 210 at 11,500 feet, the altitude sector 210 is displayed using the second visually distinguishable characteristic (e.g., green color) to indicate the aircraft is above the minimum safe altitude for the sector 210. However, if the aircraft crosses into altitude sector 208 without increasing altitude, altitude sector display process 300 displays altitude sector 208 using the first visually distinguishable characteristic (e.g., yellow color) that indicates the aircraft is below the minimum safe altitude (12,000 feet) for altitude sector 208. If the aircraft climbs to an altitude level above 12,000 feet, then altitude sector display process 300 may update and display altitude sector 208 using the second visually distinguishable characteristic (e.g., green color) to indicate the aircraft is not below the minimum safe altitude.

Figure 5:
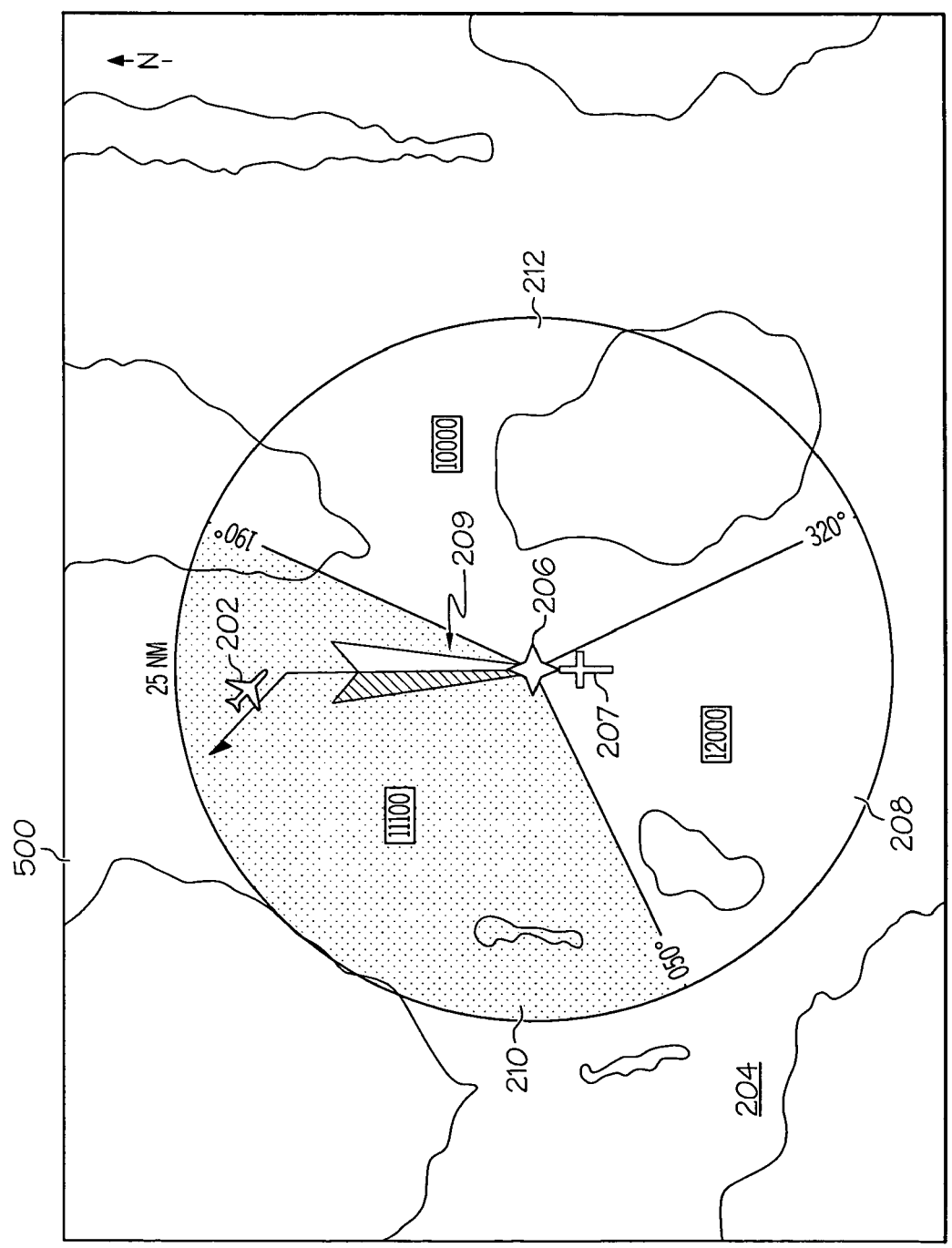
FIG. 5 is a schematic view of an exemplary navigational map, suitable for use with the altitude sector display process of FIG. 3, showing altitude sectors overlying a central portion of the navigational map in accordance with one embodiment.

Referring now to FIG. 5, in another embodiment, the altitude sector display process 300 may be configured to display altitude sectors 208, 210, 212 proximate the navigational reference point 206 on the navigational map 500 (task 304). In this regard, the sectors 208, 210, 212 are displayed in the central or main portion of the navigational map 500 as opposed to the corner or side of the map, as shown in FIG. 2. In this embodiment, the sectors 208, 210, 212 have the same orientation as the navigational map 500. For example, as shown in FIG. 5, the navigational map 500 and altitude sectors 208, 210, 212 are both oriented north-up. In other embodiments, the navigational map 500 and altitude sectors 208, 210, 212 may be oriented track-up or in some other manner that is influenced by the heading of the aircraft.

Figure 6:
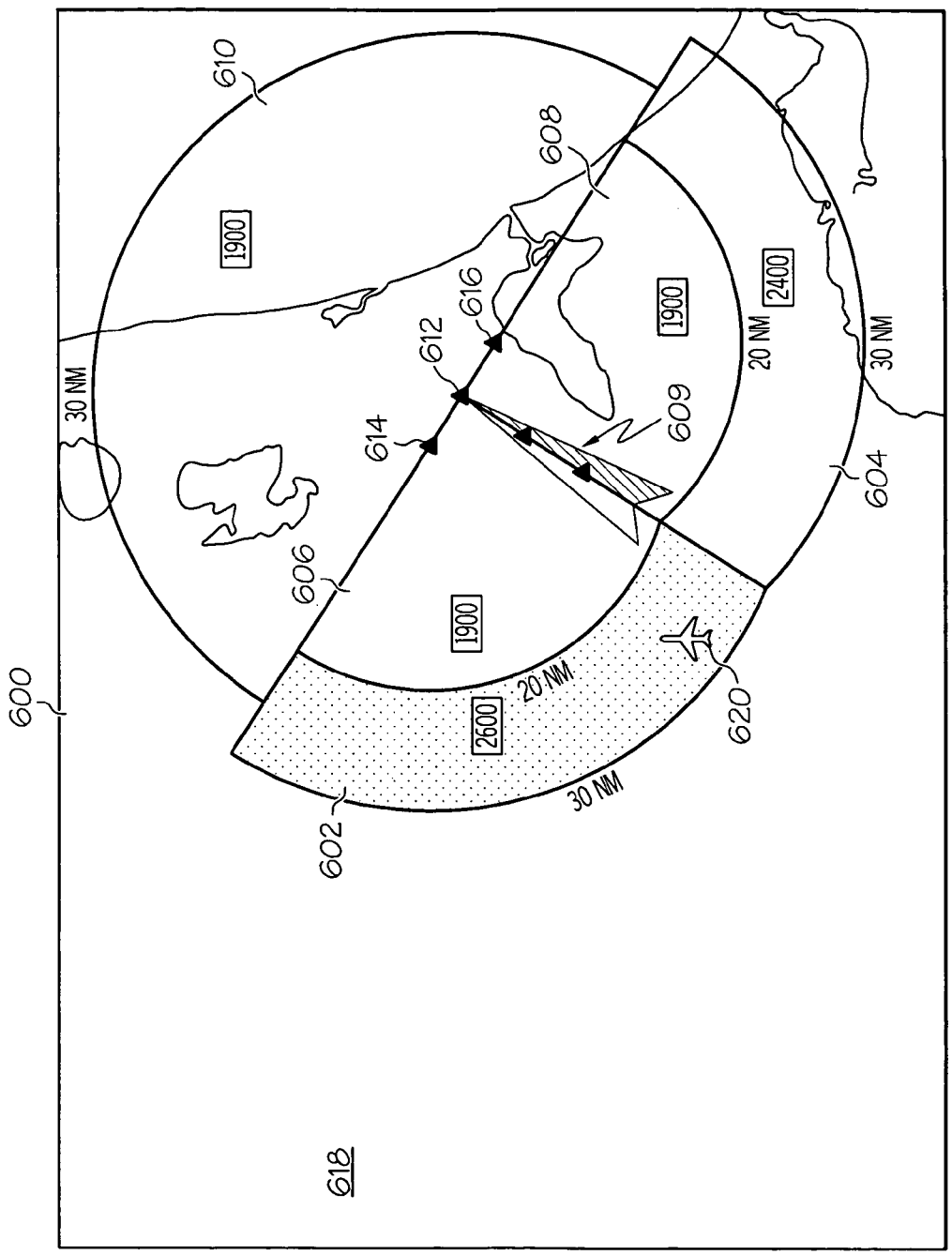
FIG. 6 is a schematic view of an exemplary navigational map, suitable for use with the altitude sector display process of FIG. 3, showing altitude sectors for a terminal arrival area in accordance with one embodiment.

Referring now to FIG. 6, in another embodiment, the altitude sector display process 300 may be utilized to render altitude sectors 602, 604, 606, 608, 610 corresponding to a terminal arrival area (TAA) on a navigational map 600. In this regard, the altitude sectors 602, 604, 606, 608, 610 may be associated with a plurality of navigational reference points 612, 614, 616, and altitude sectors 606, 608 are stepdown sectors for an approach 609. As shown in FIG. 6, the altitude sectors 602, 604, 606, 608, 610 may be displayed overlying a terrain background 618 and proximate the navigational reference points 612, 614, 616 (task 304). It should be appreciated that although FIG. 6 displays the sectors 602, 604, 606, 608, 610 in a track-up manner, the sectors 602, 604, 606, 608, 610 may also be displayed in a north-up manner. Additionally, the sectors 602, 604, 606, 608, 610 may alternatively be rendered in a corner of the map 600, similar to the altitude sectors shown in FIG. 2. Similarly, a graphical representation of the aircraft 620 in the altitude sector 602 that corresponds to the current real-world location of the aircraft relative to the navigational reference points 612, 614, 616 (task 306). Depending on the altitude of the aircraft, the identified altitude sector 602 may be displayed using a visually distinguishable characteristic, as described above (tasks 308, 310, 312).

To briefly summarize, the methods and systems described above allow a user, such as a pilot or crew member, to quickly identify and recognize whether an aircraft is flying below a designated minimum safe altitude for an altitude sector corresponding to the current location of the aircraft. This information can quickly and reliably be determined without the use of paper charts or the need to manually orient the altitude sectors based on the current heading of the aircraft. The altitude sectors may be displayed overlying the navigational map, either in the main portion of the map or to the side, and may be oriented as desired to provide greater situational awareness to a user.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for indicating on a display device associated with an aircraft whether the aircraft is below a designated altitude level, the method comprising:
displaying a graphical representation of a first altitude sector on the display device, the first altitude sector corresponding to a geographic area having a first minimum altitude criterion associated therewith; and
if a current altitude of the aircraft is below the first minimum altitude criterion, displaying the graphical representation of the first altitude sector using a first visually distinguishing characteristic, the first visually distinguishing characteristic indicating that the aircraft is below the designated altitude level for the first altitude sector.

2. The method of claim 1, further comprising displaying the graphical representation of the first altitude sector using a second visually distinguishing characteristic if the current altitude of the aircraft is above than the first minimum altitude criterion, the second visually distinguishing characteristic indicating that the aircraft is above the designated altitude level for the first altitude sector.

3. The method of claim 1, further comprising:
if a current location of the aircraft is within the first altitude sector, displaying a graphical representation of the aircraft on the display device within the graphical representation of the first altitude sector.

4. The method of claim 1, further comprising displaying the graphical representation of the first altitude sector such that the graphical representation of the first altitude sector is oriented with a heading of the aircraft.

5. The method of claim 1, further comprising displaying a terrain map associated with an instantaneous location of the aircraft on the display device, wherein the graphical representation of the first altitude sector is displayed overlying the terrain map.

6. The method of claim 1, the first altitude sector corresponding to a first geographic area proximate a navigational reference point, wherein the method further comprises displaying a graphical representation of the navigational reference point on the display device, wherein the graphical representation of the first altitude sector is aligned with the graphical representation of the navigational reference point.

7. The method of claim 6, the navigational reference point being proximate a landing location and associated with an approach path for the landing location, wherein the method further comprises displaying a graphical representation of the approach path on the display device.

8. The method of claim 6, wherein displaying the graphical representation of the first altitude sector further comprises:
determining if a distance between the aircraft and the navigational reference point is less than a first threshold distance; and
displaying the graphical representation of the first altitude sector on the display device in response to determining if the distance between the aircraft and the navigational reference point is less than the first threshold distance.

9. The method of claim 6, further comprising displaying a graphical representation of a second altitude sector on the display device, the second altitude sector corresponding to a second geographic area proximate the navigational reference point, the second altitude sector having a second minimum altitude criterion.

10. The method of claim 9, further comprising:
if a current location of the aircraft is within the second altitude sector, displaying the graphical representation of the aircraft within the second altitude sector.

11. The method of claim 10, further comprising:
if the current location of the aircraft is within the second altitude sector and the current altitude of the aircraft is below the second minimum altitude criterion, displaying the graphical representation of the second altitude sector using the first visually distinguishing characteristic to indicate that the aircraft is below the designated altitude level for the second altitude sector; and
if the current location of the aircraft is within the second altitude sector and the current altitude of the aircraft is above the second minimum altitude criterion, displaying the graphical representation of the second altitude sector using a second visually distinguishing characteristic to indicate that the aircraft is below the designated altitude level for the second altitude sector.

12. The method of claim 1, further comprising if the current altitude of the aircraft is less than the first minimum altitude criterion, providing an audible warning.

13. The method of claim 1, wherein the first visually distinguishing characteristic is selected from the group consisting of: color, hue, tint, brightness, texture, pattern, contrast, transparency, opacity, and animation.

14. A method for indicating whether an aircraft is below a designated altitude level for a geographic area, the method comprising:
rendering an image of a first altitude sector on a display associated with the aircraft, the first altitude sector corresponding to a first geographic area proximate a navigational reference point, the first altitude sector having a first designated altitude value; and
if a current location of the aircraft is within the first geographic area:
rendering an image of the aircraft on the display, wherein the image of the aircraft is positioned within the image of the first altitude sector in a manner that corresponds to the current location of the aircraft relative to a location of the navigational reference point;
if an altitude value associated with the aircraft is less than the first designated altitude value, rendering the image of the first altitude sector using a first visually distinguishing characteristic; and
if the altitude value is more than the first designated altitude value, rendering the image of the first altitude sector using a second visually distinguishing characteristic.

15. The method of claim 14, further comprising:
rendering an image of a second altitude sector on the display, the second altitude sector corresponding to a second geographic area proximate the navigational reference point, the second altitude sector having a second designated altitude value; and
if the current location of the aircraft is within the second geographic area:
rendering an image of the aircraft on the display, wherein the image of the aircraft is positioned within the image of the second altitude sector in a manner that corresponds to the current location of the aircraft relative to the location of the navigational reference point;
if the altitude value is less than the second designated altitude value, rendering the image of the second altitude sector using the first visually distinguishing characteristic; and
if the altitude value is more than the second designated altitude value, rendering the image of the second altitude sector using the second visually distinguishing characteristic.

16. The method of claim 14, further comprising rendering the image of the first altitude sector in a manner that is influenced by a heading of the aircraft, such that the image of the first altitude sector is oriented relative to the image of the aircraft.

17. The method of claim 14, further comprising rendering a terrain map on the display, wherein the image of the first altitude sector is rendered on top of the terrain map.

18. The method of claim 14, further comprising rendering an image of the navigational reference point on the display, wherein the image of the first altitude sector is positioned proximate to the image of the navigational reference point.

19. An electronic device having rendered thereon a graphical display of a navigational map associated with a current location of an aircraft, the graphical display comprising:
an altitude sector overlying the navigational map that corresponds to a geographic region having a minimum altitude value; and
an aircraft image overlying the navigational map, the aircraft image being positioned such that its position corresponds to the current location of the aircraft, wherein if the current location of the aircraft is within the geographic region that corresponds to the altitude sector:

if a current altitude of the aircraft is below the minimum altitude value, the altitude sector is highlighted using a first visually distinguishing characteristic to indicate noncompliance with the minimum altitude value; and if the current altitude of the aircraft is above the minimum altitude value, the altitude sector is highlighted using a second visually distinguishing characteristic to indicate compliance with the minimum altitude value.

20. The electronic device of claim 19, wherein the graphical display further comprises:

a navigational reference point overlying the navigational map, wherein the geographic region corresponding to the altitude sector is proximate the navigational reference point, wherein the altitude sector is aligned with the navigational reference point on the graphical display.

* * * * *